(12) United States Patent
Jiang et al.

(10) Patent No.: US 9,025,456 B2
(45) Date of Patent: May 5, 2015

(54) SPECULATIVE RESERVATION FOR ROUTING NETWORKS

(75) Inventors: Nan Jiang, Stanford, CA (US); William J. Dally, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 377 days.

(21) Appl. No.: 13/402,476

(22) Filed: Feb. 22, 2012

(65) Prior Publication Data

US 2013/0215733 A1     Aug. 22, 2013

(51) Int. Cl.
| | |
|---|---|
| H04L 1/00 | (2006.01) |
| G06F 15/16 | (2006.01) |
| H04L 12/801 | (2013.01) |
| H04L 12/913 | (2013.01) |
| H04L 12/911 | (2013.01) |

(52) U.S. Cl.
CPC .............. *H04L 47/12* (2013.01); *H04L 47/724* (2013.01); *H04L 47/822* (2013.01)

(58) Field of Classification Search
USPC ......... 370/229, 235, 242, 312, 329, 393, 394, 370/400, 412, 348; 709/213, 226, 232
See application file for complete search history.

(56) References Cited

U.S. PATENT DOCUMENTS

| | | | | |
|---|---|---|---|---|
| 8,605,578 | B1 * | 12/2013 | Govindaraju et al. | ........ 370/229 |
| 2004/0024946 | A1 * | 2/2004 | Naumann et al. | ............. 710/309 |
| 2006/0114919 | A1 * | 6/2006 | Bontempi | ..................... 370/408 |
| 2006/0168337 | A1 * | 7/2006 | Stahl et al. | .................... 709/240 |
| 2013/0283348 | A1 * | 10/2013 | Garrett et al. | ..................... 726/3 |

OTHER PUBLICATIONS

J.-L. Ferrer, E. Baydal, A. Robles, P. Lopez and J. Duato; "Congestion Management in MINs through Marked & Validated Packets", *IEEE Computer Society*, 15th Euromicro International Conference on Parallel, Distributed and Network-based Processing, 2007.

J.-L. Ferrer, E. Baydal, A. Robles, P. Lopez and J. Duato; "A Scalable and Early Congestion Management Mechanism for MINs", *IEEE Computer Society*, 18th Euromicro Conference on Parallel, Distributed and Network-based Processing, 2010.

E. G. Gran, M. Eimot, S-A. Reinemo, T. Skeie, O. Lysne L. P. Huse and G. Shainer; "First Experiences with Congestion Control in InfiniBand Hardware" *IEEE Computer Society*, 2010.

(Continued)

*Primary Examiner* — Awet Haile
(74) *Attorney, Agent, or Firm* — Crawford Maunu PLLC

(57) ABSTRACT

Aspects relate to methods, devices and manufacturing relating to routing networks including a method for routing data units. The data units are individually routable through a routing network. A reservation request data unit is received over the routing network and from a sender. At least one speculative data unit associated with the reservation request data unit from the sender is received. The at least one speculative data unit is dropped in response to the at least one speculative data unit being blocked within the routing network. The sender is provided, over the routing network, a negative acknowledgement data unit that indicates the dropping of the at least one speculative data unit. The sender is provided a grant data unit indicating a start time. After the start time, at least one non-speculative data unit corresponding to the reservation request from the sender is received.

20 Claims, 4 Drawing Sheets

(56) References Cited

OTHER PUBLICATIONS

W. Daily, "*Virtual-Channel Flow Control*," IEEE Transactions on Parallel and Distributed Systems, vol. 3, No. 2, pp. 194-205 (Mar. 1992.).

C.-Q. Yang and A. Reddy, "*A Taxonomy for Congestion Control Algorithms in Packet Switching Networks*," IEEE Network, 9(4), pp. 34-45 (Jul./Aug. 1995).

L.-S. Peh and W. Daily, "*Flit-Reservation Flow Control*," In Proceedings of the 6$^{th}$ Int'l Symposium on High-Performance Computer Architecture, Toulouse, France, pp. 73-84 (Jan. 10-12, 2000).

M. Thottethodi, A. Lebeck and S. Mukherjee, "*Self-Tuned Congestion Control for Multiprocessor Networks*," The Seventh International Symposium on High-Performance Computer Architecture, (2001).

K. Ramakrishnan, S. Floyd and D. Black, "*The Addition of Explicit Congestion Notification (ECN) to IP*," IETF, RFC 3168, pp. 1-63 (2001).

J. Santos, Y. Turner and G. Janakiraman, "*End-to-End Congestion Control for InfiniBand*," Twenty-Second Annual Joint Conference of the IEEE Computer and Communications, vol. 2, pp. 1-11 (2003).

Y. H. Song and T. M. Pinkston, "*Distributed Resolution of Network Congestion and Potential Deadlock Using Reservation-Based Scheduling*," IEEE Trans. Parallel Distrib. Syst., pp. 1-30 (Aug. 16, 2005).

J. Duato, I. Johnson, J. Flich, F. Naven, P. Garcia and T. Nachiondo, "*A New Scalable and Cost-Effective Congestion Management Strategy for Lossless Multistage Interconnection Networks*," Proceedings of the 11th International Symposium on High-Performance Computer Architecture (2005).

G. Pfister, M. Gusat, W. Denzel, D. Craddock, N. Ni, W. Rooney, T. Engbersen, R. Luijten, R. Krishnamurthy and J. Duato, "*Solving Hot Spot Contention Using InfiniBand Architecture Congestion Control*," High Performance Interconnects for Distributed Computing (2005).

S. Scott, D. Abts, J. Kim and W.J. Daily, "The Blackwidow High-Radix Clos Network," Proceedings of the 33rd Annual International Symposium on Computer Architecture (2006).

M. Al-Fares, A. Loukissas and A. Vandat, "*A Scalable, Commodity Data Center Network Architecture*," SIGCOMM Comput. Commun. Rev., 38, pp. 63-74 (Aug. 2008).

C. Guo, H. Wu, K. Tan, L. Shi, Y. Zhang and S. Lu, "*Dcell: A Scalable and Fault-Tolerant Network Structure for Data Centers*," SIGCOMM Comput. Commun. Rev., 38 (Aug. 2008).

A. Banerjee and S. W. Moore, "*Flow-Aware Allocation for On-Chip Networks*," Proceedings of the 2009 3rd ACM/IEEE International Symposium on Networks-on-Chip (2009).

A. Greenberg, J.R. Hamilton, N. Jain, S. Kandula, C. Kim, P. Lahiri, D. Maltz, P. Patel and S. Sengupta, "*Vl2: A Scalable and Flexible Data Center Network*," Proceedings of the ACM SIGCOMM 2009 Conference on Data Communication (2009).

C. Guo, G. Lu, D. Li, H. Wu, H. Zhang, Y. Shi, C. Tian, Y. Zhang and S. Lu, "*BCube: A High Performance, Senior-Centric Network Architecture for Modular Data Centers*," Proceedings of the ACM SIGCOMM 2009 Conference on Data Communication (2009).

S. Kandula, S. Sengupta, A. Greenberg, P. Patel and R. Chaiken, "*The Nature of Datacenter Traffic: Measurements & Analysis*," Proceedings of the 9th ACM SIGCOMM Conference on Internet Measurement Conference (2009).

R. N. Mysore, A. Pamboris, N. Farrington, N. Huang, P. Miri, S. Radhakrishnan, V. Subramanya and A. Vandat, "*PortLand: A Scalable Fault-Tolerant Layer 2 Data Center Network Fabric*," Proceedings of the ACM SIGCOMM 2009 Conference on Data Communication (2009).

D. Abts, M.R. Marty, P.M. Wells, P. Klausler, H. Liu, "*Energy Proportional Datacenter Networks*," Proceedings of the 37th Annual International Symposium on Computer Architecture (2010).

T. Benson, A. Anand, A. Akella and M. Zhang, "*Understanding Data Center Traffic Characteristics*," SIGCOMM Comput. Commun., Rev., 40 (Jan. 2010).

\* cited by examiner

SPECULATIVE RESERVATION FOR ROUTING NETWORKS

FIELD

Aspects of the present disclosure relate to apparatuses, devices and methods involving speculative reservation protocols for routing networks.

BACKGROUND AND OVERVIEW

The number of different applications that can, or already do, benefit from using multiple digital processing nodes/devices is near limitless. A limiting factor in the performance of many such applications is the communication capacities between the digital processing nodes. Communication or routing networks can be used to provide the communication capacities between such processing nodes. A particular type of routing network is designed to handle individually-routable data units (sometimes referred to as packets) between nodes in the routing network. Each data unit can contain information identifying the destination node so that the routing network is able to route the data unit to the proper location. This, however, does not preclude data units from containing information that indicates an association between a set of data units.

Congestion in routing networks can be particularly troublesome in certain systems. For instance, a routing network provides a shared communication medium, and therefore, the occurrence of network congestion can have a global impact on the system performance. Network congestion can result from the offered throughput on a channel being greater than the bandwidth of the channel. In a lossy network system, network congestion can result in dropped packets, which would likely need to be retransmitted. In a lossless network system, network congestion can impact the rest of the network queues in a condition sometimes referred to as tree saturation. Without proper management of network congestion, traffic flow in the network can be detrimentally affected.

SUMMARY

Aspects of the present disclosure relate generally to interfaces and methods relating to the applications discussed above.

In accordance with embodiments of the present disclosure, a method involves routing data units that are individually routable through a routing network. A reservation request data unit is received over the routing network and from a sender. At least one speculative data unit associated with the reservation request data unit from the sender is received. The at least one speculative data unit is dropped in response to the at least one speculative data unit being blocked within the routing network. The sender is provided, over the routing network, a negative acknowledgement data unit that indicates the dropping of the at least one speculative data unit. The sender is provided a grant data unit indicating a start time. After the start time, at least one non-speculative data unit corresponding to the reservation request from the sender is received.

Embodiments of the present disclosure are directed toward a routing network for routing data units through a routing network. A sender transmits a reservation request data unit over the routing network and the request is received by the routing network. The sender thereafter transmits at least one speculative data unit associated with the reservation request data unit. The speculative data unit can then be dropped if it is blocked at some point within the routing network. If the speculative data unit is dropped, a negative acknowledgement (NACK) data is provided to the sender. The NACK indicates to the sender that the at least one speculative data unit was dropped. A grant data unit is generated and provided to the sender. The grant data unit includes an indication of a start/transmission time. The sender transmits, after the start time, at least one non-speculative data unit corresponding to the reservation request.

Other embodiments are directed toward a sending device, for communicating data units. The data units (packets) are individually routable through a routing network to which the sending device is coupled. The sending device has logic circuitry configured and arranged to access data for transmission to a receiving device reachable through the routing network and to generate a reservation request data unit that includes an indication of a destination device and an indication of a number of data units being requested for transmission to the destination device. The logic circuitry is further configured to generate at least one speculative data unit corresponding to at least one of the data units being requested for transmission to the destination device. The logic circuitry is configured and arranged to receive a negative acknowledgement data unit that includes an indication of the reservation request data unit and an indication that the speculative data unit was dropped. The logic circuitry is also configured and arranged to receive a grant data unit that includes an indication of the reservation request data unit and an indication of a time for transmission of the data units being requested for transmission to the destination device. The logic circuitry is further configured to generate at least one non-speculative data unit corresponding to at least one of the data units being requested for transmission to the destination device and including data corresponding to the dropped speculative data unit.

Various embodiments also contemplate that the sending device can include functionality that allows for receipt of data units transmitted over the routing network. These functions can include a reservation scheduler to determine a time provided as part of a grant data unit. This function can be implemented, for instance, using a register that maintains or tracks the earliest grant time for the next incoming reservation. When a grant is issued, this register is incremented by the reservation size.

The above summary is not intended to describe each embodiment or every implementation of the present disclosure. The figures, detailed description and claims that follow more particularly exemplify various embodiments.

BRIEF DESCRIPTION OF THE DRAWINGS

Aspects of the present disclosure may be more completely understood in consideration of the detailed description of various embodiments of the present disclosure that follows in connection with the accompanying drawings, in which.

Figure 1:
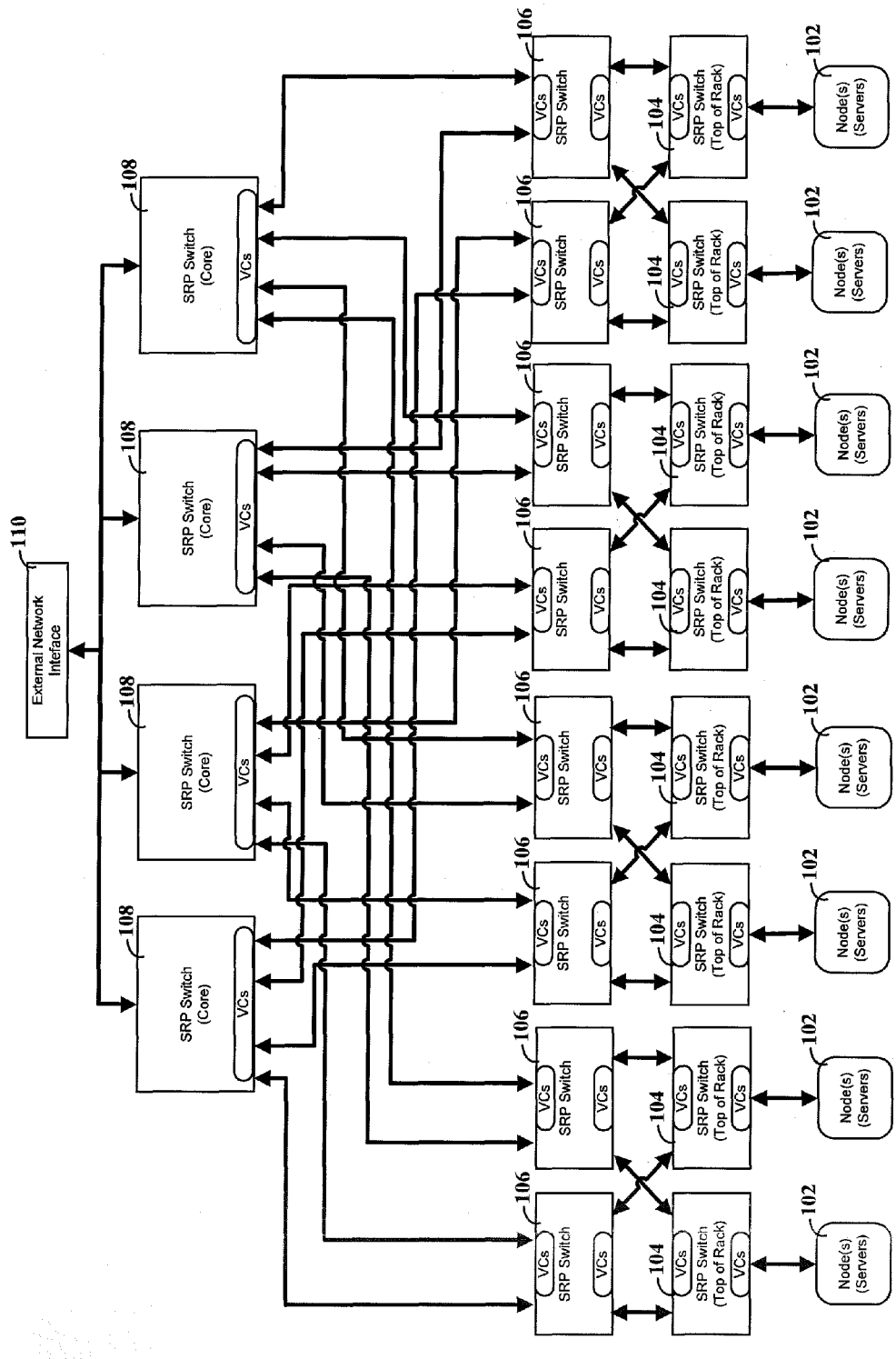
FIG. 1 depicts a 3-level router network, consistent with embodiments of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION

The present disclosure relates to devices for routing networks, to methods of using routing networks and to methods of manufacturing routing networks. While the present disclosure is not necessarily limited to such devices and applications, various aspects of the disclosure may be appreciated through a discussion of examples using these and other contexts.

Aspects of the present disclosure relate to routing networks, which can be useful for congestion management. The shared communication medium of a routing network can have an adverse effect on the performance of the entire system using the routing network. Particular aspects of the present disclosure recognize that how quickly a network responds to network congestion can be useful in improving the performance of the system. Other aspects recognize that transmission latencies and other inefficiencies are undesirable. Accordingly, embodiments of the present disclosure are directed toward routing network solutions that route a first type of data units (packets) that can be dropped (speculative) and a second type of data units that are not dropped (non-speculative).

Particular embodiments of the present disclosure are directed toward the use of a transmission time or transmission schedule that is provided as part of a grant of shared communication resources of the routing network. The grant can be provided in response to a request to allocate shared resources for the purpose of transmitting data units. In response to the transmission schedule, data units can be transmitted as non-speculative data units.

Certain aspects of the present disclosure allow for speculative data units to be transmitted when access to a shared resource is unconfirmed, such as in the absence of receipt of a grant and/or transmission schedule.

Various embodiments of the present disclosure can be particularly useful for Data Center and Cloud Computing technologies. In these and other networks with ample bisection bandwidth, congestion often occurs on ejection channels at network endpoints. Accordingly, aspects of the present disclosure recognize that network endpoint hot-spots can occur in a wide range of network operations. For instance, programming models used in large computer systems, such as map-reduce, can have hot-spot behavior. It is also recognized that even if the network traffic is uniform and random, multiple senders may temporarily converge on a single destination and form a transient hot-spot. Traffic unable to be serviced by the over-subscribed destination is left in the router queues causing network congestion.

Aspects of the present disclosure relate to the recognition that feedback mechanisms can reduce the bandwidth relative to data units provided to a routing network; however, such feedback mechanisms can suffer due to any latency between the onset of congestion and the reduction of bandwidth. Certain aspects of the present disclosure can be particularly useful for reducing latency in feedback mechanisms useful for counteracting network congestion. According to certain feedback mechanisms, when the network detects network congestion, it signals sources contributing to the congestion to reduce their input bandwidth. The congestion signal can be sent via an explicit message or piggybacked on data unit acknowledgments from the destination. While such approaches can reduce network congestion, there can still be various problems, such as system stability, a need for parameter adjustment, and congestion response time.

Certain aspects of the present disclosure are directed toward reducing transmission latencies. For instance, transmission latencies can occur in routing networks that use a request/reservation-grant protocol when there is a delay between the transmission of a request and the issuance of a grant. This can be particularly problematic when the routing network has available bandwidth during the delay period. Accordingly, aspects of the present disclosure are directed toward reducing transmission latency for routing networks.

Embodiments of the present disclosure are directed toward a routing network and a method for routing data units through a routing network. A sender transmits a reservation request data unit over the routing network and the request is received by the routing network. The sender thereafter transmits at least one speculative data unit associated with the reservation request data unit. The speculative data unit can then be dropped if it is blocked at some point within the routing network. If the speculative data unit is dropped, a negative acknowledgement (NACK) data is provided to the sender. The NACK indicates to the sender that the at least one speculative data unit was dropped. A grant data unit is generated and provided to the sender. The grant data unit includes an indication of a start/transmission time. The sender transmits, after the start time, at least one non-speculative data unit corresponding to the reservation request.

Certain embodiments are directed toward a routing device for routing data units, the data units being individually routable through a routing network of which the device is a part. The device includes an interface circuit configured and arranged to receive a reservation request data unit transmitted over the routing network. A control circuit is configured and arranged to determine that the at least one speculative data unit is blocked within the routing network. The control circuit is also configured and arranged to drop the at least one speculative data unit in response to determining that the at least one speculative data unit is blocked. The control circuit is also designed to generate a negative acknowledgement (NACK) data unit that indicates the dropping of the at least one speculative data unit. Generation of a grant data unit, indicating a start time, is also part of the control logic's functionality. After the start time, the control logic routes at least one non-speculative data unit corresponding to the reservation request data unit from the sender.

Other embodiments are directed toward a sending device, such as a Network Interface Controller (NIC), for communicating data units. The data units (packets) are individually routable through a routing network to which the sending device is coupled. The sending device has logic circuitry configured and arranged to perform various functions. The functions include accessing data for transmission to a receiving device reachable through the routing network and generating a reservation request data unit that includes an indication of a destination device and an indication of a number of data units being requested for transmission to the destination device. The functions also include generating at least one speculative data unit corresponding to at least one of the data units being requested for transmission to the destination device; receiving a negative acknowledgement data unit that includes an indication of the reservation request data unit and an indication that the speculative data unit was dropped; and receiving a grant data unit that includes an indication of the reservation request data unit and an indication of a time for transmission of the data units being requested for transmission to the destination device. Finally, the logic circuitry is configured to generate at least one non-speculative data unit corresponding to at least one of the data units being requested for transmission to the destination device and including data corresponding to the dropped speculative data unit.

Various embodiments also contemplate that the sending device can include functionality that allows for receipt of data units transmitted over the routing network. These functions can include a reservation scheduler to determine a time provided as part of grant data unit. This function can be implemented, for instance, using a register that maintains or tracks the earliest grant time for the next incoming reservation. When a grant is issued, this register is incremented by the reservation size.

Still further aspects of the present disclosure recognize that protocol overhead can be a relevant factor in overall system performance. Accordingly, embodiments and aspects of the present disclosure can be particularly useful for providing low-overhead solutions in a routing network context.

Embodiments of the present disclosure are directed toward a Speculative Reservation Protocol (SRP), which can provide a congestion management mechanism for system area networks. The term SRP is used to describe a number of different embodiments and features. Many of these embodiments and features can be used both separately and/or in combination with various other embodiments and features. For instance, SRP can include destination bandwidth reservations, which can be useful for avoiding congestion. Surprisingly, the SRP can be designed for use with a relatively low overhead and complexity. SRP can use a very light weight reservation protocol with reduced scheduling complexity. The SRP reservation scheduling provides a streamlined statistical mechanism that prevents the over-subscription of any network destination, reducing/eliminating network hot-spot congestion.

In certain embodiments, SRP avoids the latency overhead associated with reservation protocols by allowing network sources to transmit data units speculatively without reservation. Speculative data units are sent with a short time-to-live and are dropped (and retransmitted with reservation) if network congestion begins to form. Various embodiments are directed toward the use of SRP in a manner that provides one or more of a rapid transient response to the onset of network congestion, low overhead and fairness between data flows competing for a network hot-spot.

When multiple nodes are contending for a hot-spot destination and each source tries to send at the maximum rate (which can be equal to the rate of each of the links), a shared link between the nodes eventually backs up into other links. This can affect the performance of nodes wishing to use the other links. Even though these other links may have spare bandwidth, the bandwidth cannot be utilized due to congested data units present in the input and output buffers. Moreover, local fairness policies of the routers can further reduce the throughput for each traffic flow.

For various embodiments, network congestion can be detected by monitoring the occupancy of input or output buffers of a routing network. When the sender receives an indication of the congestion, it can incrementally reduce its transmission rate, helping to relieve the point of congestion. In the absence of such indications, the sender can gradually increase its injection rate to fully utilize the bandwidth of an uncongested network. Aspects of the present disclosure recognize, however, that the incremental nature of the algorithm can result in a slow response to the onset of congestion. Moreover, the set of parameters that regulate the behavior of such algorithms can result in network instability if they are not carefully controlled. While such incremental feedback approaches can be used in combination with various embodiments discussed herein, certain embodiments do not use an incremental feedback approach.

Various SRP-related embodiments provide a mechanism for proactively avoiding congestion. SRP can use a reservation-grant handshake between the sender and the receiver to avoid overwhelming the destination with data units. To reduce the latency overhead associated with the reservation round-trip, the sender can begin transmitting data units speculatively before the reservation returns. The speculative data units can be dropped by the network if congestion begins to form (e.g., by dropping the speculative data units after the expiration of a time period). Non-speculative data units can be transmitted upon receipt of a grant and/or after a time period specified within the grant.

Turning now to the figures, FIG. 1 depicts a 3-level router network, consistent with embodiments of the present disclosure. Nodes 102 represent potential senders and destinations for data units (packets) transmitted through the routing network. The routing network includes switches 104, 106 and 108, where each set of switches represents a different level in the routing network. (Optional) external network interface 110 provides an interface to networks and devices external to the router network of FIG. 1. The particular configuration of the routing network of FIG. 1 is provided by way for example and is not necessarily limiting. Various different routing network configurations, depths and interconnections are possible. Notwithstanding, a number of embodiments and features are discussed in terms of the particular routing network depicted in FIG. 1 while not necessarily limiting the discussed embodiments and features thereto.

Nodes 102 can communicate with one another using a routing network that includes the SRP switches. In a first application, nodes 102 can be servers that are part of a data center and/or cloud computing technologies. The nodes 102 can represent, or be a part of, a rack of servers. These servers can connect to a common SRP switch 104, which can sometimes be referred to as a top-of-rack switch. One or more additional switch levels 106 and 108 can provide a routing structure, sometimes referred to as a tree routing solution. In some instances, the switches are designed to handle increasing bandwidths and the last level of switches 108 is sometimes referred to as a core level of switches. The physical location and function of the switches can be varied according to the particular application. For instance, network adapters of nodes/servers 102 can provide (virtual) switching functionality for a first level of switches.

In other embodiments, the nodes can represent one or more processors communicating with one another and/or accessing a shared resource or memory using a routing network. The nodes can be located on a common integrated circuit (e.g., a system-on-chip with multiple processors) or separate integrated circuits.

Consistent with embodiments of the present disclosure, SRP can facilitate congestion avoidance using a reservation-grant handshake between the sender and the receiver, where the grant indicates that non-speculative data units can be transmitted. The grant can indicate a delay period before transmission of a data unit, which can be useful for avoiding overwhelming the destination and intermediate routing paths with data. To reduce the latency overhead associated with the reservation round-trip, the sender can begin transmitting data units speculatively before the reservation returns. Thus, the speculative data units can use available bandwidth before a grant is returned to the sender. The speculative data units can be dropped by the network, when congestion forms. By dropping the speculative data units, congestion for data units that are not dropped (non-speculative data units) can be reduced or avoided.

The congestion points can occur at different switches and different levels within the routing network. When a speculative data unit is sent (before a grant is received at the sender), it can be stored in buffers and corresponding virtual channels (VCs). If there is not sufficient bandwidth to transmit the speculative data unit in a certain amount of time, then the speculative data unit can be dropped. Moreover, if there is the potential for network congestion, then the grant can indicate a longer time period for the sender to delay before beginning transmission of non-speculative data units. This delay can mitigate the formation of network congestion.

Figure 2:
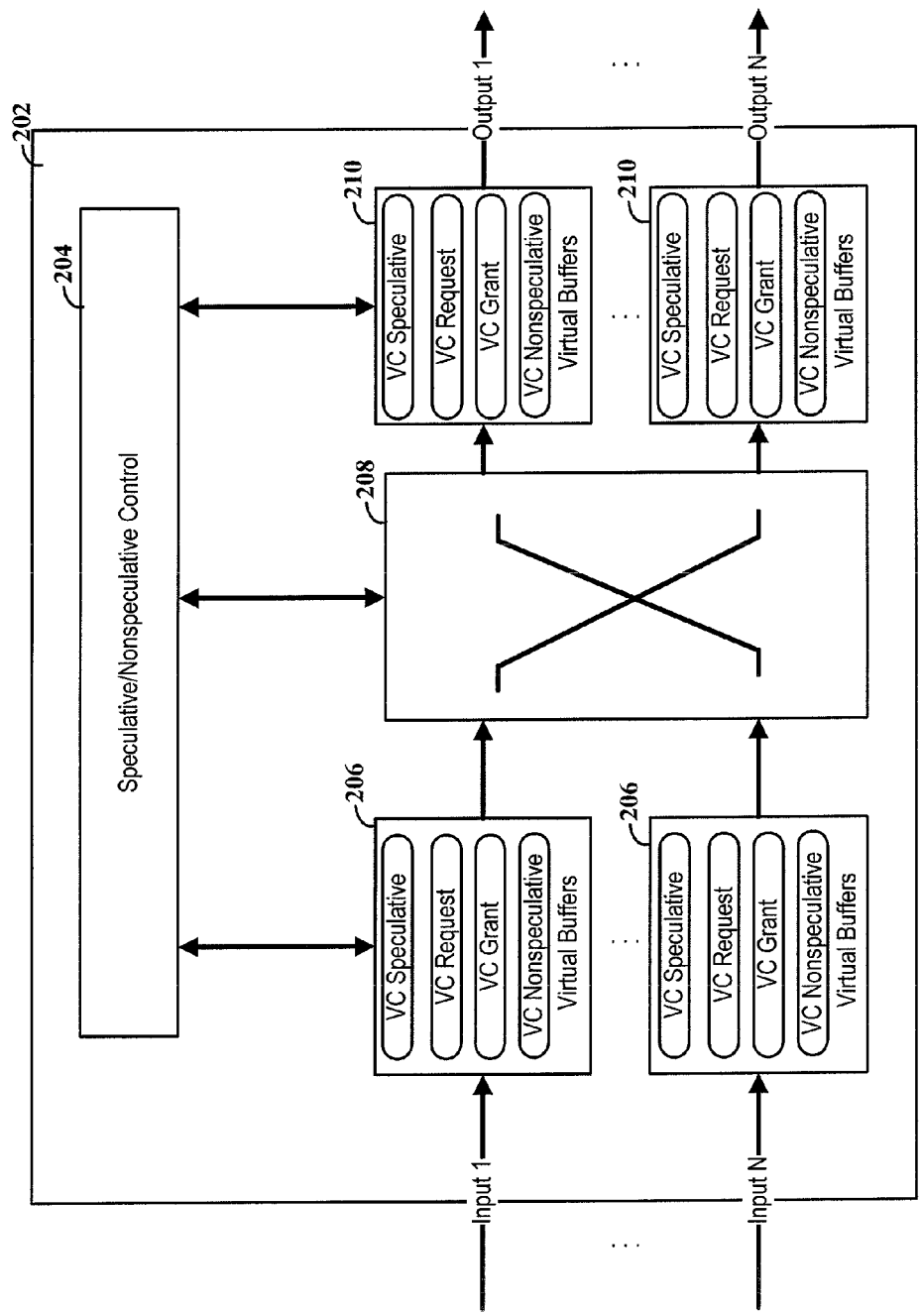
FIG. 2 depicts a SRP switch, consistent with embodiments of the present disclosure.

FIG. 2 depicts a SRP switch, consistent with embodiments of the present disclosure. SRP switch 202 is configured to route data units received on inputs 1-N to a selected one of outputs 1-N. The number of inputs and outputs (and the ratio between inputs and outputs) is relatively arbitrary and can be selected based upon the desired parameters of the routing network. Received data units can be stored in input buffers 206 under the direction of control logic 204 before they are provided to switching fabric 208. The input buffers 206 can be used to store data units according to virtual channels (VCs) that can be designated by control logic 204.

Control logic 204 can identify received data units according to whether the data units are speculative and non-speculative. Data units of each of these identified types can then be given different priorities and access to shared resources of the SRP switch 202 can be given based upon the priorities. For instance, different types of VCs (speculative and non-speculative) can be assigned different priorities and data units can then be stored in the corresponding VC. Other priority-based determinations (and VCs) can also be used including, but not necessarily limited to, a high-level priority for reservation request and grant data units.

In particular embodiments of the present disclosure, the reservation data unit (and corresponding grant data unit) can have a small data size and a high network priority (relative to speculative and, potentially, also relative to non-speculative data units with payload data), and travels on or is assigned to a specific control VC. This can be particularly useful for providing rapid delivery of the data units.

Output buffers 210 can also be used to store data units before they are sent onward (e.g., to either another switch or to a destination node). Output buffers 210 can also include multiple different types of VCs under the control of control logic 204.

Figure 3:
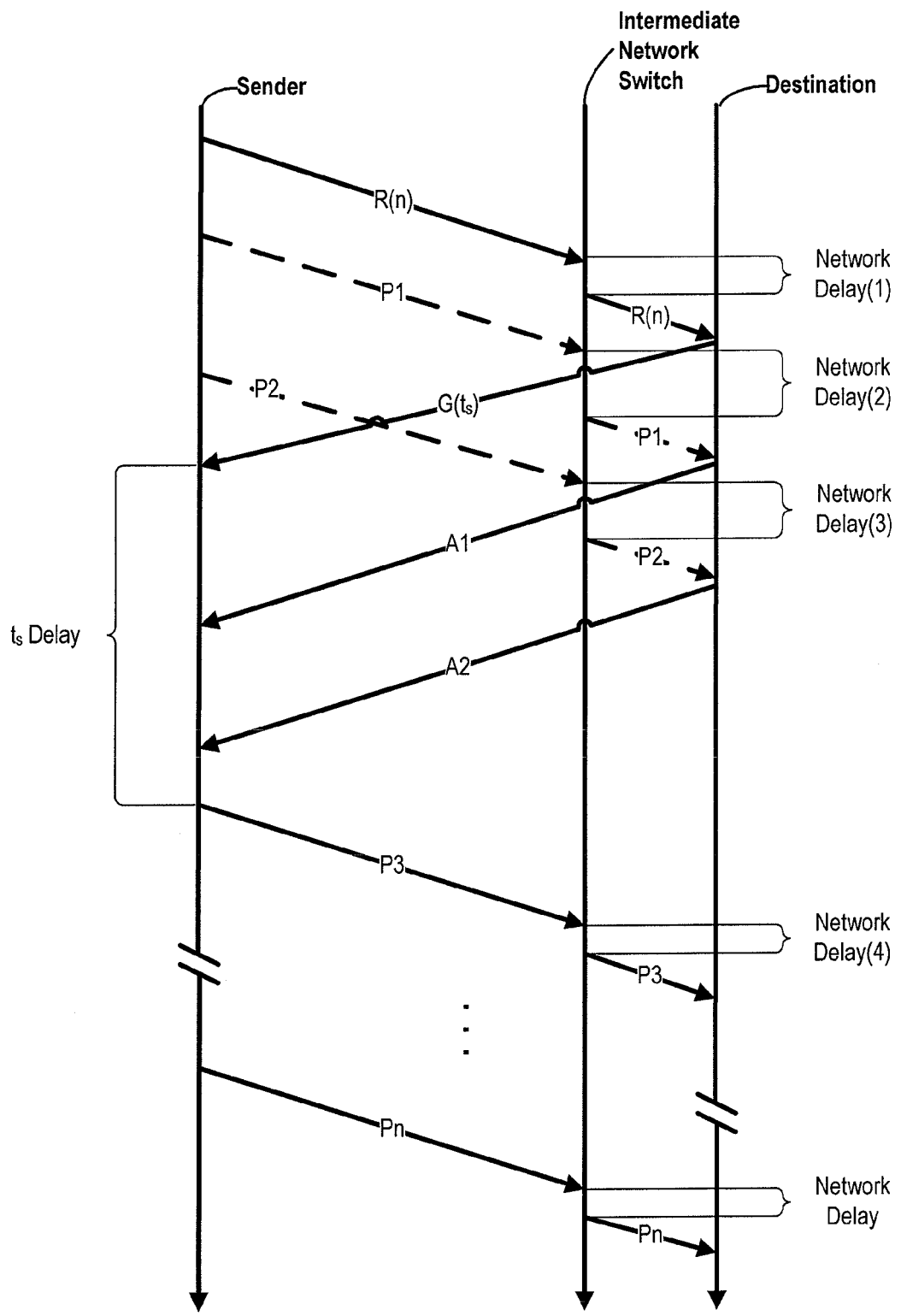
FIG. 3 depicts a data flow and timing diagram for an SRP routing network with no or low network congestion, consistent with embodiments of the present disclosure.

FIG. 3 depicts a data flow and timing diagram for an SRP routing network with no or low network congestion, consistent with embodiments of the present disclosure. The data flow diagram of FIG. 3 represents a scenario in which network congestion does not currently exist in the network or is otherwise not sufficient to cause speculative data units to be dropped.

FIG. 3 shows that a sender device wishing to communication with a destination device begins by issuing a reservation request data unit/data unit (R). In certain embodiments, this reservation request data unit can be relatively small, have a high network priority, and travel on a separate control Virtual Channel (VC) to provide for rapid delivery to the destination. Reservation Delay(1) represents the time the reservation request data unit is delayed within a particular Intermediate Switch. The use of a high-priority VC can be particularly useful for keeping this delay time low.

Consistent with embodiments of the present disclosure, the reservation request data unit can include a reservation size, n, which indicates the number of (payload carrying) data units the sender is requesting reservation for transmission. By allowing for multiple data units to be reserved with a single request-grant pair, the overhead of request and grant data units can be spread across multiple data units. Increases to the average size in reservation requests can therefore result in reductions to the overall overhead of the SRP routing network.

After issuing the reservation (and before receipt of a corresponding grant), the sender can begin speculatively sending data units P1 and P2 to the destination. These speculative data units can travel on a low priority VC and have a limited Time To Live (TTL) before they are dropped. Thus, speculative data units are dropped if they are blocked in the network for more than a period of time specified by their TTL. FIG. 3 shows network delays (2) and (3), for speculative data units P1 and P2, respectively. The speculative data units P1 and P2 are not dropped because the network delays do not exceed the TTL, and the speculative data units successfully reach the destination. In certain embodiments, the TTL check can occur at the head of the input buffer, however, checks can occur at alternative or additional locations.

In order to avoid data units from being lost, speculative data units are accompanied with acknowledgments to indicate their transmission success or failure. Alternatively, the protocol could assume failure or success and provide only an indication of the condition. Thus, the protocol could assume that all speculative data units are successful and provide indications only if a speculative data unit is dropped.

Once the reservation data unit arrives at the destination, the destination generates and transmits a grant data unit G. The grant data unit G can contain a "starting time," ts, for payload data units. The start time, ts, can be determined based on any previous reservation commitments. In addition, the destination can update its reservation schedule such that the next arriving reservation from any network source will be issued a starting time based upon previous reservation commitments. For instance, subsequent start times can be calculated using the algorithm ts+(n+εn)τp. The constant $\tau_p$ is the time it takes to receive a single data unit on the node ejection channel. The parameter ε is a small adjustment factor in the scheduling, which can account for the bandwidth overhead of control data units or other factors.

After the sender receives the grant data unit, it stops transmission of speculative data units to the destination. After reaching the start time, ts, the sender begins transmitting non-speculative data units to the destination, starting with data unit P3. The non-speculative data units can be transmitted using a non-speculative (payload) VC that provides a higher priority relative to a speculative VC. The previously-mentioned VC for requests and grants can be given an even higher priority, or equal priority, depending upon the configuration. The routing network is configured such that non-speculative data units are not dropped and therefore do not require acknowledgments (although acknowledgments could be provided if desired). After transmitting all n data units, future non-speculative communication between the sender and the destination can be initiated using a new reservation.

Figure 4:
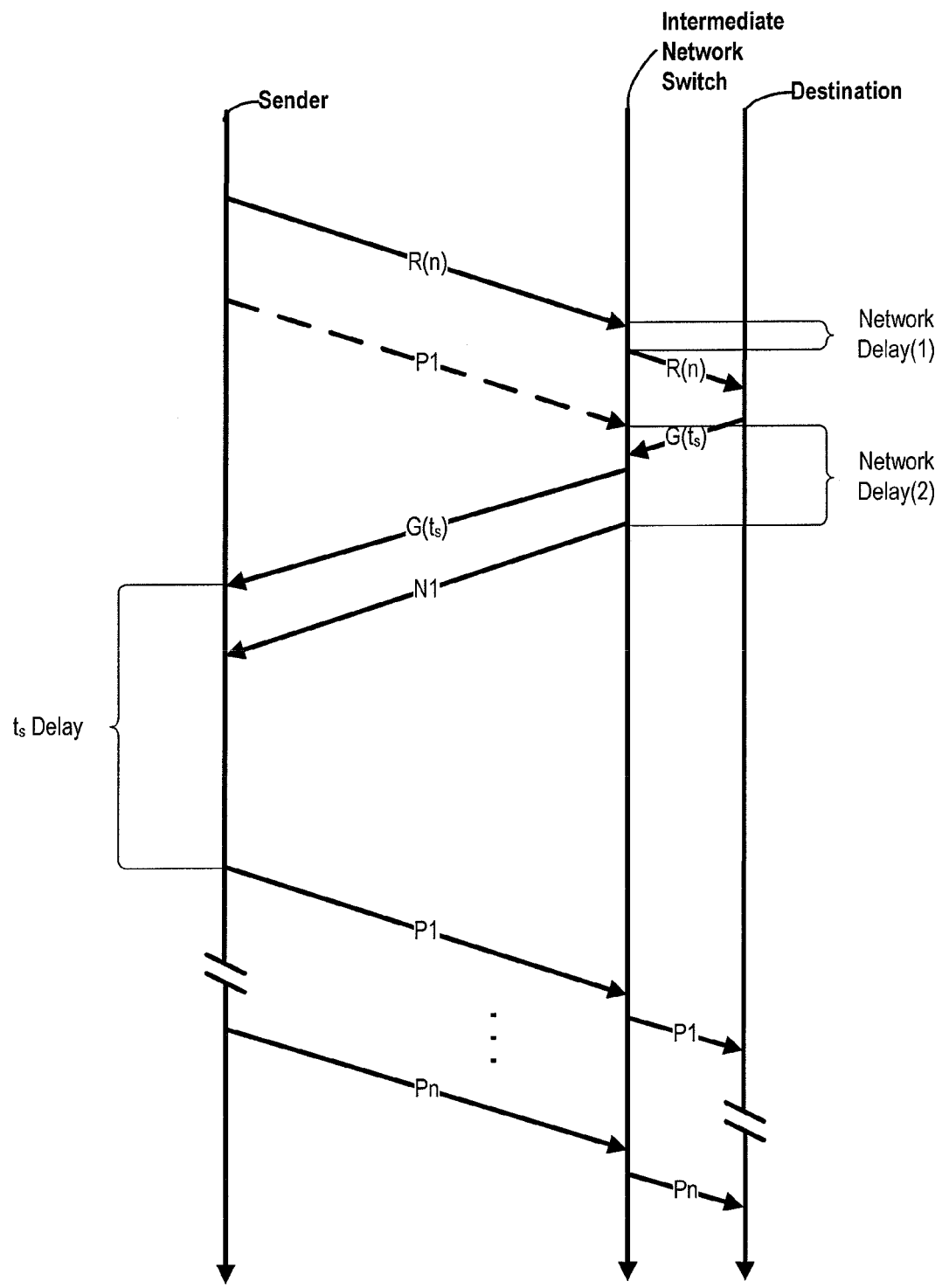
FIG. 4 depicts a data flow and timing diagram in which an SRP routing network has network congestion, consistent with embodiments of the present disclosure.

FIG. 4 depicts a data flow and timing diagram in which an SRP routing network has network congestion, consistent with embodiments of the present disclosure. The intermediate network switch has congestion and represents a hot-spot. Initially, the sender behaves identically to the discussion of FIG. 3, including sending the reservation request data units, R(n), and speculative data unit(s), P(1). The reservation data unit, having higher network priority than speculative data units (and/or non-speculative payload data units), arrives at the destination. The sender's speculative data unit, P(1) may encounter large queuing delay, network delay(2) on a speculative VC at or near the destination. When this queuing delay exceeds the TTL for the speculative data unit, the data unit is dropped by the switch/router. A negative acknowledgment (NACK) can then be provided to the sender.

A receipt of a NACK data unit by a sender can indicate network congestion. Accordingly, the sender can respond to the NACK data unit by stopping transmission of additional speculative data units. The sender can thereafter resume transmission using non-speculative (payload) data unit, P(n). The non-speculative (payload) data units can include any previously-dropped speculative data units.

Consistent with certain embodiments of the present disclosure, the TTL can be a fixed value based on the data unit latency distribution of the network under high load uniform random traffic. Other embodiments allow for variable/configurable TTL including dynamic changes in response to routing network properties.

Aspects of the present disclosure recognize that dropping of speculative data units has the potential to result in out of order data unit arrival. For instance, referring to FIG. 4, if the NACK data unit were to return after ts, the sender would send the next data unit before retransmitting the dropped non-speculative data unit. Thus, the data units can be received out of order. Accordingly, embodiments of the present disclosure are directed toward preventing such out of order transmission by retransmitting all outstanding speculative data units at the grant time ts. The destination device can then identify and discard the duplicative data units. This can help prevent out of order arrival of data units, albeit with additional bandwidth cost of duplicate data units.

Factors in the configuration and operation of an SRP routing network include low latency and low bandwidth overhead. Sending speculative data units can help reduce the latency. At low to medium network loads, many, most or even all, speculative data units will reach their destination and SRP's latency can be effectively the same as that of a routing network without congestion compensation. Bandwidth overhead can include control data units and dropped speculative data units. To reduce control overhead, the reservation/grant/ACK/NACK data units can be generated having a smaller size than (payload) data units.

Moreover, the bandwidth consumed by each reservation is amortized across n data units. This reservation size, n, is another variable that can be adjusted. Consistent with embodiments of the present disclosure, the reservation size n can be limited to a certain range of acceptable values. The lower limit, n(min), represents the minimum reservation flow size. In certain embodiments, data flows smaller than this lower bound may choose to bypass the reservation protocol using only speculative data units, and thereby reduce overhead. In certain embodiments, speculative data units from such small data flows can be aggregated into a single larger data flow and corresponding reservation. In some embodiments, the aggregation can occur in response to speculative data units first being transmitted, but then being dropped. This allows for the small data flows to be transmitted using speculative data units when little or no congestion occurs, but also allow the use of non-speculative data units where congestion might prevent the transmission using speculative data units.

The upper limit, n(max), provides the reservation granularity. Flows larger than this ceiling are sent using several reservations, one for each set of n(max) data units. While this chunking is not necessary for all embodiments, it can be useful for preventing long flows from monopolizing a network destination.

Aspects of the present disclosure recognize that at high network load, the speculative data unit drop occurs more frequently due to increasing queuing delays. Such speculative data unit drop wastes network bandwidth and can increase overhead at high load. Embodiments of the present disclosure recognize that the amount of overhead due to such effects can be controlled by adjusting the speculative TTL and the reservation granularity. This adjustment can occur during initial configuration or the routing network or it can be adjusted dynamically (e.g., in response to active conditions of the routing network). Routing network conditions can include, but are not limited to, queue depth and bandwidth statistics.

Embodiments of the present disclosure are directed toward the use of a reservation data unit that includes a speculative data portion. This hybrid data unit, containing data for both a reservation and data-flow payload, can be initially transmitted as a speculative data unit with a certain TTL. If the TTL expires, the speculative data portion of the hybrid data unit can be dropped. The reservation portion of the hybrid data unit can then be routed as a non-speculative data unit. This upgrade in status can also include an upgrade in priority relative to control data units.

Certain embodiments allow a sender to include a reservation request as the tail data unit of a current/previous reservation. For instance, a reservation request for n data units can include a reservation request for another data flow as the nth data unit is transmitted. In other variations, the subsequent/piggybacked request can be sent at an earlier (data unit less than n) point in the reserved data flow. This earlier transmission time can be particularly useful for avoiding reservation delay (e.g., the time after the final (nth) data unit is transmitted and before a grant data unit is received).

Other embodiments of the present disclosure allow for grant data to be sent/piggybacked as part of an acknowledgement data unit. For instance, the receiving device may receive a speculative data unit that corresponds to the grant before the grant is transmitted back to the sending device. Accordingly, a single, hybrid data unit can be used to transmit both data that provides acknowledgement of the speculative data unit and data that indicates granting of the request.

Other embodiments are directed toward a hold (grant) data unit that can indicate that a destination is busy and thereby inform the source to stop sending speculatively. This hold data unit can be provided without issuing a time slot otherwise associated with a grant data unit. This can be particularly useful for configurations that use a queue structure at the destination, where the queue structure provides for higher priority reservations that can preempt lower priority requests.

Accordingly, embodiments are also directed toward the use of interrupt data units. If a higher priority reservation request is received relative to current reservation(s), the lower reservation(s) can receive a new transmission time in the form of an interrupt data unit. This can be particularly useful for facilitating the preemption of lower priority reservations by higher priority reservations.

Embodiments of the present disclosure also recognize that different scheduling structures are possible for issuance of granted time slots for transmission of non-speculative data units. One such structure uses a next available time slot register to provide an incoming reservation request with a grant time that is set according to the next available time. This can be regardless of other factors, such as the relative priority of the reservation requests or the current routing network conditions.

Another scheduling structure relates to the use of a priority queue. An incoming reservation can be placed in this priority queue according to arrival time and the relative priority of the request. In certain instances, the destination can use a hold (grant) data unit to stop speculative transmission for requests having a lower priority. The issuance of a grant data unit can be delayed until the reservation is near the head of the queue thereby allowing higher priority requests to supersede lower priority requests.

A reservations scheduler can also be configured to schedule grants in response to in-network congestion events or other routing network conditions. For instance, certain channels can be marked as bottleneck channels. Each channel determines a time at which it can provide the necessary bandwidth. The channel then checks a field to compare a currently stored time (from previous channels) against the determined time and updates the request if the determined time is later than the stored time. The destination can then generate a grant that provides an issue time of no earlier than the channel reservation time.

Certain embodiments contemplate the transmission of small data flows using non-speculative data units. Certain embodiments can include a limitation on the length of such non-speculative data flows. Moreover, the non-speculative data flows can be prevented (e.g., by setting the maximum length to 0), e.g., in response to various network conditions or other inputs.

Other embodiments can maintain in-order transmission of speculative data units by, for instance, not sending consecutive speculative units until after acknowledgement that the speculative data unit was successfully transmitted and not dropped.

Certain configurations and embodiments recognize that a sender can transmit one or more duplicate speculative data units. In one instance, the duplicate speculative data units can be transmitted after receiving an indication that the speculative data units were dropped. In another instance, the sender can transmit duplicate data before receiving an indication that the (retransmitted) speculative data units were dropped. For instance, the sender can manage retransmissions by resending after a timeout period. If, however, an acknowledgement of successful transmission for a particular data unit is received before the timeout period, the sender can avoid duplicative transmission of the particular data unit. This can be particularly useful for reducing the latency between retransmissions, albeit, with consideration to the overhead resulting from unnecessarily retransmitted data units.

Various experimental embodiments and results present insights into the performance and behavior of embodiments of an SRP routing network. While these experimental results can be useful, they do not necessarily limit, or even properly characterize, all embodiments of the present disclosure. A particular experiment involves the use of a cycle accurate network simulator in which three networks were compared—a baseline network with no congestion control, a SRP-type network, and a network implementing reactive/feedback congestion control (referred to as an explicit congestion notification network or "ECN"). Each of the simulated networks included a 64-node 3-level Fat Tree. 8-port routers are used in the first two levels, each with four down channels and four up channels. The top level of the Fat Tree uses 4-port routers with four down channels. The network uses nearest-common-ancestor routing.

A data unit is first routed up the tree using randomly assigned up channels. When the data unit reaches the router that is the lowest common ancestor of both the source and destination nodes, it is routed down the tree deterministically to the destination node. All network channels had the same bandwidth and were capable of transmitting a single flit per simulation cycle. The latency of all channels was set as one cycle.

The routers in these networks used a credit-based wormhole flow control. In the baseline network, a single type of VC was used to transmit (payload) data units. In the ECN network, a control VC was added for acknowledgment data units. The SRP network had two control VCs, one that was used by the reservation data units, and the other being used by the grant, ACK, and NACK data units. An additional low priority data VC was added to SRP for the speculative data units. In both the ECN and SRP networks, the control VCs were given a higher priority than the (payload) data VCs.

For the experimental tests, the payload data units were set to 16 flits and the control data units were set to a single flit. In all three networks, the main data VC used Virtual Output Queuing (VOQ) to avoid Head-of-Line (HoL) blocking. All other VCs used single FIFO input buffers. The input buffer size per VC was 16 data units. The router crossbar had a 2× speedup over the network channels. This speedup combined with VOQ data VC resulted in nearly 100% router throughput for random traffic. At the crossbar output, each VC had a 4-data unit output buffer. Crossbar and channel arbitration used priority arbiters.

Two types of synthetic traffic patterns were used in the experiments. For benign traffic cases, Uniform Random (UR) traffic is used. A variant of UR traffic, Background Uniform Random (BUR), was used in some tests to study the effect of hot-spots on unrelated traffic flows. BUR excluded the hot-spot nodes when selecting random destinations. Hot-spot traffic was used to generate network congestion.

All network traffic was generated by the nodes in units of flows. Each flow ranged in size from a single data unit to hundreds of data units. When transmitting flows, the network node used a mechanism involving queue-pairs. The transmitting node creates a separate send queue for each destination. Similarly, each receiving node creates a separate receive queue for each source. The send queues at each node arbitrate for the injection channel in a round-robin fashion. SRP can be modified to accommodate different node designs, such as the detailed Network Interface Controller (NIC) designs.

The results of the experiment show the surprising effectiveness of the SRP proactive congestion mitigation. Relative to the baseline network, the utilization of links otherwise subject to backup from a congestion point, increased significantly due to a 47% increase in the throughput of the congested link. Under SRP, the congested hot-spot data units were queued outside of the network. As a result, network resources remained free for use by uncongested flows. Using SRP, the hot-spot link showed a 5% lower data throughput compared to the baseline network. This small reduction is believed to be due to the reservation overhead adjustment factor.

The results of the experiment also show the surprising fairness for flows competing for a resource/link subject to hot-spot congestion in a SRP routing network. Compared to the baseline network, SRP showed that the hot-spot senders receive an equal share of the bandwidth for a contested resource/link. Since each traffic flow acquires reservations from the destination independently, equal shares of reservations were returned to each flow and therefore provided flow-level fairness. Thus, with SRP enabled, each hot-spot sender was able to acquire an equal share of reservations from the destination, resulting in fair throughput for all transmitting sources.

In-flight data unit latency is another indicator of network congestion. With a 63:1 over-subscription of the hot-spot, total data unit latency (including source queuing delay) is unbounded. In-flight data unit latency can be determined based upon the total data unit latency less the source queuing delay. This value represents a direct measurement of the amount of network resources consumed by each data unit. For some of the experimental tests the baseline network was shown to have an in-flight data unit latency of approximately 40,000 cycles. This is believed to be symptomatic of tree congestion. Nearly every network queue on the paths to the hot-spot was completely filled. Also, due to an unfair allocation of network bandwidth, nodes closer to the hot-spot had a much lower latency than farther nodes, resulting in a high variance latency distribution. With SRP, the average in-flight data unit latency was 37 cycles, only slightly higher than the zero-load latency of 29. This low latency is believed to be the result of proactively mitigating congestion, as opposed to reactively correcting for congestion. Hence most data units traversed the network with little or no queuing delay. The average in-flight data unit latency of the ECN network was 160 cycles. This higher latency is believed to have occurred because the ECN network requires some congestion before it reacts. For instance, unless the queues reach their thresholds no source throttling occurs. This leads to a latency penalty that is believed to be due to reacting to congestion rather than proactively mitigating congestion.

Other experiments related to demonstrating the absence of hot-spot congestion by using a combined traffic pattern of hot-spot and Background Uniform Random (BUR) traffic. In these experiments the hot-spot traffic was held constant at 63:1 over-subscription and the injection rate of the BUR traffic was varied. The networks were also tested under only UR traffic to establish a reference. Both the BUR and UR traffic had a flow size of 8-data units and the hot-spot flows were infinite. In the baseline network, the hot-spot traffic congested the network causing the BUR traffic to saturate at less than 1%. With SRP, the BUR traffic remained stable even at high network loads. When compared against the pure UR reference curve, the BUR traffic had a 2% lower saturation throughput caused by the hot-spot flow bandwidth. A deeper look into the SRP network showed that at each node, the send queue to the hot-spot destination received a very high reservation starting time that causes long stalls, while the send queues to other network destinations had a starting time that allowed them to transmit immediately. This experiment suggests that SRP completely eliminated the effect of the hot-spot on background traffic, whereas the baseline network did not appear to be able to sustain any substantial background traffic when a hot-spot is active in the network. The ECN network was also able to provide high background traffic throughput in the presence of a hot-spot. At steady state, the hot-spot send queues at each node became heavily throttled by congestion notifications leaving network resources available for the BUR traffic.

Experimental results support that SRP networks, in addition to lower in-flight latency, offer a fast response to the onset of congestion. When the hot-spot traffic is initiated by the sender it immediately becomes regulated by the reservation protocol and congestion on the (payload/non-speculative) data VC can be avoided. While congestion may occur on the speculative VC, the speculative data units have a low network priority and will time out if they encounter congestion. Accordingly, the congestion response time of the networks was tested using a step-function traffic pattern. In this traffic configuration, the network was first subjected to UR traffic (20% load). After 100K simulation cycles, the traffic pattern was switched to a combination of BUR (20% load) and 63:1 hot-spot traffic for the rest of the simulation. The flow size for both traffic patterns was 8 data units. The total data unit latency and throughput of the uniform traffic was recorded for each cycle before and after the transition to monitor the initial impact of the hot-spot. The results included an average of 100 simulations using different random seeds for respective startups. Multiple simulations were used to obtain an adequate sample size for each transient point.

In the SRP network, the hot-spot onset had virtually no observable effect on the total data unit latency or throughput of the background uniform traffic. The ECN network experienced a large latency spike and throughput reduction after the start of the hot-spot. Over the course of 120K cycles, the latency and throughput of the ECN network recovered to pre-transition levels. Near the end of the recovery period, the throughput curve spiked in what was believed to be a correction for the post-transition throughput deficiency.

The experimental results also suggest that SRP achieved good latency and throughput performances under benign traffic patterns. At low network loads, SRP was shown to have a low latency overhead. In this region of operation, most speculative data units were successfully delivered to the destination, and the reservation round-trip delay was masked by the overlapping speculative data unit transmission. As the network load increased, queuing delay on the speculative VC caused data units to be dropped and the latency effect of reservation became more noticeable. The SRP latency overhead peaked at 70% network load and was 15% higher than the baseline. At very high network load, the latency overhead of SRP disappeared relative to the baseline network, which began to saturate due to transient hot-spots.

Experimental tests in which the networks ran uniform random traffic of various flow sizes suggested that as the flow size increased, the saturation throughput of the baseline network actually decreases. This is believed to be due to transient load imbalances caused by bursty traffic. Thus, multiple flows converging on a destination resulted in the formation of a temporary hot-spot. Without providing additional buffering, the network saturation throughput was lowered. The effect of large flows was believed to have been mitigated in networks with congestion management because transient load imbalance could be eliminated without additional buffers. By throttling the transient hot-spot flows, the network remained uncongested, allowing other data units to utilize the network resources. This was evident in both SRP and ECN throughput. As the traffic flow sizes increased, the throughput of both networks remained high.

For flows smaller than the minimum reservation flow size (n(min)=4 data units), the reservation protocol was not triggered and the SRP network behaved essentially as the baseline network without any congestion control. In a simulation using a flow size of 4, the reservation protocol was activated and the network with SRP showed a 4% higher saturation throughput compared to the baseline, and 3% higher than the ECN throughput. For larger flow sizes, SRP successfully mitigated the effects of transient load imbalance from the network. For the two largest flow size tests, the saturation throughput of SRP essentially converged, suggesting that it will maintain the high throughput performance for even larger traffic flows.

The experiments also suggest that SRP achieved good latency and throughput performances under benign traffic patterns. This includes the results of a comparison of data unit latency vs. throughput of SRP for uniform random traffic with a flow size of 8 data units. At low network loads, SRP had a negligible latency overhead compared to the baseline network. In this region of operation, most speculative data units were believed to be successfully delivered to the destination, and the reservation round-trip delay was masked by the overlapping speculative data unit transmission. As network load increased, queuing delay on the speculative VC caused data units to be dropped and the latency effect of reservation became more noticeable. The SRP latency overhead peaked at 70% network load and was 15% higher than the baseline. At very high network load, the latency overhead of SRP (virtually) disappeared as the baseline network began to saturate due to transient hot-spots.

The experimental results also suggest that selection of various network control parameters can affect the performance of SRP, including its bandwidth overhead. This is achieved by choosing appropriate values for the various parameters including, but not necessarily limited to, the parameters discussed hereafter.

The experiments included the monitoring of the network channel utilization running UR traffic with a flow size of 4 data units. At injection rates lower than 0.84 flits/cycle SRP used less than 5% additional bandwidth than the baseline network. This is believed to be due to control and speculative data unit drop overhead. Above 0.84 flits/cycle, the baseline network saturated and a corresponding larger gap in utilization is believed to be due to the SRP network having higher saturation throughput.

The experimental results suggest that the minimum reservation flow size n(min) can be important to limit the bandwidth overhead to less than 5%. If all flows smaller than four data units acquired reservations, overhead would increase to 20% for single data unit flows, causing the SRP network to saturate earlier than the baseline. To avoid this high overhead, a minimum reservation flow size, n(min) can be used to allow small flows to ignore the reservation protocol.

The experimental results also suggest that the bandwidth overhead of SRP was mostly due to dropped speculative data units. The speculative injection and drop rates were determined as a function of the overall injection rate as part of simulation for UR traffic with 4-data unit flows. As the injection rate increased, the injection rate of speculative data units also increased, peaking at about 50% network load, and then decreased. Because speculative data units had a lower network priority, normal (non-speculative) data units are preferentially admitted into the network relative to a speculative data unit. Above 50% network load, this caused the speculative injection rate to decrease. At higher load, the drop rate increased despite a lower speculative injection rate. The queuing delay at high load caused the fraction of speculative data units experiencing time out to increase significantly. Overall, the bandwidth wasted by the speculative data units was only about 3% of total bandwidth.

The experiments also indicate that the speculative drop rate, and hence the bandwidth overhead, could be reduced by increasing the speculative TTL. The drop rate curves of SRP networks with speculative TTL ranging from 200 to 800 cycles were monitored. The rate curves showed that every doubling of the TTL reduced the peak drop rate by approximately 50% and delayed the drop rate increase by 10% network load. A higher TTL resulted in the speculative VC to become more congested in the presence of hot-spot traffic; however, it is not believed to affect normal (non-speculative) data units or reservation data units which travel on separate, uncongested VCs.

A related consideration is that increases to the speculative TTL were shown to slow speculative retransmission. In certain embodiments, a speculative data unit is only retransmitted when a NACK is received. With a high TTL, this may not happen until long after the rest of the flow has already been transmitted non-speculatively. An alternate fast retransmit protocol resends the outstanding speculative data units when all other data units in the reserved block have been sent. While this protocol eliminates/mitigates the latency issues with high TTL, it can introduce additional overhead by occasionally retransmitting data units that have not been dropped.

Other experimental results suggest that bandwidth overhead can be reduced by increasing n(max), the reservation granularity. Speculative data units are intended to cover the round-trip latency of the reservation handshake. With a higher network priority and dedicated control VCs, the handshake round-trip remains at zero-load latency even for very high network load. Thus, the number of speculative data units is bounded above by a constant times the number of reservation round trips. For longer traffic flows, increasing the reservation granularity, n(max), reduces the number of reservation handshakes and hence reduces the speculative injection rate and the speculative drop rate. This effect was observed by comparing the reservation granularity with the speculative drop rate for uniform random traffic with a flow size of 16 data units. With n(max)=4, a 16-data unit flow required four reservation handshakes. As a result, its peak speculative drop rate was 3 times higher than for n(max)=8. Similarly, increasing n(max) to 16 reduced the peak drop rate by an additional 70%.

Certain embodiments allow for the use of statistical analysis to configure the speculative TTL and reservation granularity during initialization. Other embodiments recognized that dynamic adjustment of these parameters can also be implemented in response to current network conditions. For instance, if the sender knows the network is at high load but uncongested, it can choose to not transmit any data units speculatively or to send speculative data units with very high TTL to increase the probability of delivery.

The SRP parameters can also be adjusted to accommodate different network configurations including, but not necessarily limited to, accounting for different unloaded network latencies. This can have a direct impact on the amount of SRP bandwidth overhead. With higher latency, the speculative TTL can be increased proportionally to prevent premature time outs. A larger network can also increase the reservation round trip delay and increase the number of data units sent speculatively. Therefore, the reservation granularity can be increased and thereby reduce the number of speculative drops at high network loads.

The scalability of SRP was analyzed using a simulation of a four level Fat Tree with a total of 256 nodes and by increasing the network channel latency to 10 cycles. Using the same set of SRP parameters as a 64-node network, the larger network was able to effectively manage congestion formed by 255:1 oversubscribed hot-spot traffic pattern. However, under UR traffic with 8-data unit flows, the SRP network had a 10% lower saturation throughput than the baseline network with no congestion control. For a 64-node network SRP had a 9% higher saturation throughput than the baseline network for the same traffic pattern. The reduced saturation throughput is believed to be the result of speculative data unit drop overhead. The network throughput recovered to the same level as the smaller network when the speculative TTL is increased to match the higher network latency.

Experiments in which small flows were allowed to bypass the reservation protocol showed that the SRP's ability to control network congestion caused by small flows was compromised. This is not believed to be a significant problem because much network congestion is caused by large flows. However, if congestion control for small flows is desired, embodiments of the present disclosure allow for the use of ECN data unit marking in order to selectively enable SRP for small flows. When a congestion notification is received, SRP is enabled for small flows to that destination. Multiple small flows to the same destination can also be coalesced into a single reservation to amortize overhead.

Often network congestion is caused by oversubscribed network destinations. In networks with sufficiently provisioned bandwidth, this is often the only cause of network congestion. However, in an under-provisioned network, congestion can arise due to overloaded network channels. Certain embodiments of the present disclosure include reserved bandwidth only at the endpoints. It is recognized, however, that two fully reserved nodes, sharing only a single network channel will cause channel congestion. If the networks have path diversity, adaptive routing will resolve the congestion by spreading bandwidth across multiple network channels. With path diversity, the problem can be thought of as a problem of channel load imbalance, not congestion, and the adaptive routing solution can be used in combination with a SRP implementation.

The experiments suggest that SRP provides flow-level fairness in a network whose routers implement locally-fair allocation policies. This behavior is surprising given that a reservation data unit from the nearby nodes can reach the destination faster than those from the far side of the network. However, the latency of the reservation round-trip only affects the number of speculative data units sent by each node, not the node's share of total bandwidth. As long as the throughput of reservation data units in the network is stable, each node is believed to receive an equal share of data bandwidth. In certain implementations, the reservation data units have the highest network priority and a single-flit data unit size. Thus, sustained congestion does not occur on the control VC and long-term reservation fairness is guaranteed. A congestion control solution for bandwidth under-provisioned networks can include reservations for the bottleneck network channels as well as endpoints. Alternatively, an additional congestion notification mechanism, such as ECN, can be used to alert the sender of channel congestion.

In certain embodiments, the reservation data units are themselves unregulated. Thus, temporary congestion of the control VC can occur in (rare) circumstances. The response of SRP to an impulse traffic pattern was tested relative to this phenomenon. The network was warmed up under 20% UR traffic for 100K cycles. Then, for a single cycle, every node in the network initiated a small hot-spot flow (8-data units). Finally, after the impulse, all nodes returned to UR traffic. This single cycle impulse caused 63 reservation data units to be injected simultaneously, creating a temporary reservation hot-spot. A dip in network throughput was observed for several hundred cycles after the impulse. However, because the reservation data units were small, the temporary congestion of the control VC quickly dissipated and the network throughput returned to normal. While this example demonstrates that a reservation hot-spot is possible, such simultaneous instantiation of network traffic is unlikely to occur for standard applications.

Embodiments of the present disclosure include routing networks and/or the various components of the routing network. The components can include a Network Interface Controller (NIC) and a network router. On the receiving side of the NIC, a reservation schedule register can be maintained to track the earliest grant time for the next incoming reservation. When a grant is issued, this register is incremented by the reservation size. On the sender side, the configuration can depend on how the NIC supports data flows. In a system using queue-pairs, for instance, the NIC can issue a reservation data unit and transmit (non-speculative) data units initially in speculative mode. These speculative data units can be retained in the NIC buffers until a positive acknowledgement is received.

The network routers can include control circuitry for dropping a speculative data unit and for sending a corresponding NACK. Data unit drop can be handled by the input buffer logic when a data unit arrives from the channel or when it reaches the head of an input queue. A NACK data unit generation can be handled by transforming the head flit of the dropped data unit into a NACK data unit.

In one embodiment, two control VCs and a single speculative VC are each added to the network. The characteristics of these VCs make their implementation cost lower than normal data VCs. The control VCs can be designed to handle only small data units and therefore can be expected to have a low utilization factor. Therefore, they can be designed with a low buffering requirement. The speculative VC will drop a data unit when its cumulative queuing delay exceeds its TTL. Thus, the buffers on the speculative VC can be sized to match the TTL of the speculative data units. While the buffer cost of SRP can be relatively small, additional complexity is introduced into the router allocators and arbiters to handle the additional virtual channels and data unit priorities.

The above-mentioned experiments used a network with a single data VC. In networks with multiple data VCs, it is believed that the control and speculative VCs can be shared by all data VCs without a significant impact on performance. This is because the load on the control VCs is proportional to the amount of data injected by the node regardless of the number of data VCs. While data units from multiple data VCs share resources on the same speculative VC, this can be acceptable because these data units can eventually fall back on their dedicated data VC when they expire. In instances where there are multiple data VCs with different Quality of Service (QoS), the reservation data units can be prioritized to reflect the QoS levels. In this scenario, multiple control VCs may also be used to avoid priority inversion due to head-of-line blocking.

Other experimental embodiments involved the use of a simulated network that was configured as a 256-node 2-level Fat Tree. 32-port routers are used on the first level, each with 16 down channels and 16 up channels. The second level of the Fat Tree used 16-port routers with down channels only. The routers' operating frequency was set at 1 GHz and the zero-load latency through each router was 26 ns. The network used nearest-common-ancestor routing. A data unit was first routed up the tree using randomly assigned up channels. When the data unit reaches the router that is the lowest common ancestor of the source and the destination, it is routed down the tree deterministically to the destination node. Each network channel, including injection and ejection links, had a capacity of 10 Gb/s and a latency of 32 ns.

The simulated routers used credit-based virtual cut-through flow control. In the baseline network, a single VC is used to transmit all network traffic. In the ECN network, a control VC was added for congestion notification data units. The SRP network had two control VCs: one is used by the reservation data units, and the other is used by the grant, ACK, and NACK data units. An additional low-priority data VC was added to SRP for the speculative data units. In both ECN and SRP networks, the control VCs had higher priority than the data VCs.

The experimental test collected throughput and latency statistics of a 256-node Fat Tree network running a 40:1 hot-spot traffic over the course of 50 ms simulated time. In this experiment, 40 nodes continuously transmitted 8-data unit messages to a single network destination. The set of nodes was randomly selected and used in all three networks. The baseline network showed a large variation in throughput for different hot-spot senders. Nodes that shared the same first-level router with the hot-spot received higher throughput than those from other parts of the network. With SRP enabled, the same set of hot-spot senders was able to acquire an equal share of reservations from the destination, resulting in very little variation in sender throughput. The average sender throughput for SRP was 5% lower than for other networks, which is believed to have been due to the overhead adjustment factor. The ECN network showed a higher variation in sender throughput than SRP, while outperforming the baseline.

The absence of hot-spot congestion was observed using the combined traffic pattern of hot-spot and background UR traffic. In these simulations the hotspot traffic was maintained at 40:1 over-subscription and the rate of UR traffic injected by other nodes not participating in the hot-spot was varied. Networks were also simulated without hot-spot traffic to establish a reference. Both hot-spot and UR traffic had a message size of eight data units. In the baseline, the hot-spot led to severe network congestion, causing the background uniform traffic to saturate at less than 10% network capacity. With SRP, the background uniform traffic remained stable even under very high network loads. The experimental results suggest that at each node of the SRP network, the send queue to the hot-spot destination received a very high reservation starting time that caused long stalls, while the send queues to other network destinations had a starting time that allowed them to transmit immediately. This experiment suggests that SRP is effective at reducing or eliminating the effect of the hot-spot on background traffic.

Transient behavior, including congestion response time, was also tested using a step-function traffic pattern similar to the previously described experiment. In this traffic configuration, the network was warmed up with UR traffic (40% load). After 1 ms simulated time, the traffic pattern was switched to a combination of background uniform (40% load) and 40:1 hot-spot traffic for the rest of the simulation. The message size for both traffic patterns was eight data units. The total data unit latency and throughput of the uniform traffic was recorded each cycle before and after the transition in order to monitor the initial impact of the hot-spot. An average of 100 simulations was taken, each using different random seeds. Multiple simulations were used to provide an adequate sample size for each transient point.

The hot-spot onset was shown to have little observable effect on the total data unit latency or the throughput of the background uniform traffic. Thus, the experiments suggest that SRP works well across the entire range of hot-spot over-subscription factors with no need to adjust protocol parameters.

Latency and throughput were also tested under benign traffic patterns. The latency-throughput curves of SRP, with a message size of four data units, suggest that at low loads, SRP has a negligible latency overhead (e.g., compared to the baseline network). As the network load increased, queuing delay on the speculative VC was believed to cause more data unit drops, and the latency effect of reservation was more noticeable. The experiment suggested that SRP latency overhead peaks at 85% network load and is 25% higher than the baseline. At even higher network load, the latency overhead of SRP disappears as the baseline network begins to saturate.

The saturation throughput of networks running uniform random traffic was tested with various message sizes. In addition, the networks' throughput was measured using a combination of different message sizes. In the bimodal mode (Bi), traffic comprised equal fractions of short (4-data unit) and long (64-data unit) messages. In the mixture mode (Mix), the message size was uniformly distributed between 4 and 64 data units. The results were largely consistent with the aforementioned experiments.

The various embodiments as discussed herein may be implemented using a variety of structures and related operations/functions. For instance, one or more embodiments as described herein may be computer-implemented or computer-assisted, as by being coded as software within a coding system as memory-based codes or instructions executed by a logic circuit, computer processor, microprocessor, PC or mainframe computer. Such computer-based implementations are implemented using one or more programmable or programmed circuits that include at least one computer-processor and internal/external memory and/or registers for data retention and access. One or more embodiments may also be implemented in various other forms of hardware such as a state machine, programmed into a circuit such as a field-programmable gate array, or implemented using electronic circuits such as digital or analog circuits. In addition, various embodiments may be implemented using a tangible storage medium that stores instructions that, when executed by a processor, performs one or more of the steps, methods or processes described herein. These applications and embodiments may also be used in combination; for instance certain functions can be implemented using discrete logic (e.g., a digital circuit) that generates an output that is provided as an input to a processor. For instance, control logic for a router or NIC can be implemented using a combination of logic circuitry and a processing circuit configured using firmware or other software.

While the present disclosure is amenable to various modifications and alternative forms, specifics thereof have been shown by way of example in the drawings and will be described in further detail. It should be understood that the intention is not to limit the disclosure to the particular embodiments and/or applications described. On the contrary, the intention is to cover all modifications, equivalents, and alternatives falling within the spirit and scope of the present disclosure.

What is claimed is:

1. A method for routing data units, the data units being individually routable through a routing network, the method comprising:

receiving a reservation request data unit at a receiving node over the routing network and from a sender;

receiving at least one speculative data unit associated with the reservation request data unit from the sender at a network routing device, wherein the at least one speculative data unit is communicated from the sender with an indication whether the at least one speculative data unit is speculative, wherefrom the network routing device recognizes and drops said at least one speculative data unit before it reaches the receiving node and before a grant for the reservation request data unit occurs;

dropping the at least one speculative data unit at the network routing device in response to the at least one speculative data unit being blocked within the routing network;

providing, on behalf of the network routing device to the sender and over the routing network, a negative acknowledgement data unit that indicates the dropping of the at least one speculative data unit;

providing, to the sender, a grant data unit indicating a start time; and receiving, after the start time, at least one non-speculative data unit corresponding to the reservation request from the sender;

wherein the at least one speculative data unit and the at least one non-speculative data unit are differentiable as indicated by data in or associated with the reservation request data unit transmitted over the routing network, wherein the network routing device is further configured to place the reservation request data unit in a first data queue corresponding to a first virtual channel, to place the at least one speculative data unit in a second data queue corresponding to a second, different virtual channel and to process data units in the first data queue at a higher priority than data units in the second data queue.

2. The method of claim 1, further including detecting an elapsed queue time for the at least one speculative data unit and wherein the elapsed queue time represents that the at least one speculative data unit is blocked within the routing network.

3. The method of claim 1, wherein the reservation request data unit includes an indication of a number of data units to be transmitted by the sender in connection with the request, and further including the step of determining whether a received one of the data units corresponds to said at least one speculative data unit or to said at least one non-speculative data unit and, in response to the step of determining, preventing the received data unit from being dropped.

4. The method of claim 1, further including the step of generating, at the sender,
the reservation request data unit;
the at least one speculative data unit; and
in response to receiving the negative acknowledgement, a non-speculative data unit data that includes data from the dropped at least one speculative data unit.

5. The method of claim 1, wherein the first virtual channel is reserved for non-speculative data units and wherein the second, different virtual channel is reserved for speculative data units.

6. The method of claim 1, further including routing an additional speculative data unit from the sender and providing, to the sender, an acknowledgement data unit that indicates the sending of the at least one speculative data unit.

7. The method of claim 1 further including a step of adjusting, in response to network load conditions, at least one of:
a minimum and maximum value representing a number of data units that can be indicated by a single request data unit, and
an in-flight time period that specifies when to drop a speculative data unit.

8. The method of claim 1, wherein the reservation request data unit includes a speculative data portion in addition to a request data portion.

9. The method of claim 1, wherein, in addition to a request data portion, the reservation request data unit includes a non-speculative data portion that corresponds to a previous reservation request data unit.

10. The method of claim 1, further including providing, in response to another reservation request data unit, a hold grant data unit indicating that neither speculative data units nor non-speculative data units should be sent.

11. The method of claim 1, further including providing, to the sender and in response to another reservation request data unit having a higher priority than the original reservation request data unit, another grant data unit indicating another start time that is later than the original start time.

12. A routing device for routing data units, the data units being individually routable through a routing network of which the device is a part, the device comprising:
an interface circuit configured and arranged to receive a reservation request data unit transmitted over the routing network; and
a control circuit configured and arranged to
determine that at least one speculative data unit is blocked within the routing network,
drop the at least one speculative data unit in response to determining that the at least one speculative data unit is blocked;
generate a negative acknowledgement data unit that indicates the dropping of the at least one speculative data unit;
generate a grant data unit indicating a start time;
route, after the start time, at least one non-speculative data unit corresponding to the reservation request data unit from a sender; and
wherein the at least one speculative data unit is communicated from the sender, through the network routing device, with an indication whether the at least one speculative data unit is speculative, wherefrom the network routing device is configured and arranged to recognize and drop said at least one speculative data unit before it reaches a designated receiving node and before a grant for the reservation request data unit occurs;
wherein the at least one speculative data unit and the at least one non-speculative data unit are differentiable as indicated by data in or associated with the reservation request data unit transmitted over the routing network, wherein the control circuit is further configured and arranged to place the reservation request data unit in a first data queue corresponding to a first virtual channel, to place the at least one speculative data unit in a second data queue corresponding to a second, different virtual channel and to process data units in the first data queue at a higher priority than data units in the second data queue.

13. The device of claim 12, wherein the control circuit is further configured and arranged to determine whether a received data unit is a speculative data unit or a non-speculative data unit and to prevent a non-speculative data unit from being dropped.

14. The device of claim 12, wherein the at least one speculative data unit and the at least one non-speculative data unit are differentiable as indicated by the reservation request data unit transmitted over the routing network, and wherein the first virtual channel is reserved for non-speculative data units and wherein the second, different virtual channel is reserved for speculative data units.

15. The device of claim 12, wherein the at least one speculative data unit and the at least one non-speculative data unit are differentiable as indicated by the reservation request data unit transmitted over the routing network, further including a switching fabric configured and arranged to route data units received at a plurality of inputs to one of a plurality of outputs.

16. An apparatus for communicating data units, the data units being individually routable through a routing network to which the apparatus is coupled, the apparatus comprising:
a routing device;
logic circuitry configured and arranged to
access data for transmission to a destination device reachable through the routing network;
generate a reservation request data unit that includes an indication of the destination device and an indication of a number of data units being requested for transmission to the destination device;

generate at least one speculative data unit corresponding to at least one of the data units being requested for transmission to the destination device;

receive a negative acknowledgement data unit on behalf of the routing device that includes an indication of the reservation request data unit and an indication that the speculative data unit was dropped;

wherein the routing device is configured and arranged to route data units between the sending device and the destination device and to store data units in buffers configured to provide virtual channels;

receive a grant data unit that includes an indication of the reservation request data unit and an indication of a time for transmission of the data units being requested for transmission to the destination device;

generate at least one non-speculative data unit corresponding to at least one of the data units being requested for transmission to the destination device and including data corresponding to the dropped speculative data unit; and wherein the at least one speculative data unit is communicated from the sender, through the network routing device, with an indication whether the at least one speculative data unit is speculative, wherefrom the network routing device is configured and arranged to recognize and drop said at least one speculative data unit before it reaches a designated receiving node and before a grant for the reservation request data unit occurs wherein the at least one speculative data unit and the at least one non-speculative data unit are differentiable as indicated by data in or associated with the reservation request data unit transmitted over the routing network, wherein the network routing device further configured to place the reservation request data unit in a first data queue corresponding to a first virtual channel, to place the at least one speculative data unit in a second data queue corresponding to a second, different virtual channel and to process data units in the first data queue at a higher priority than data units in the second data queue.

17. The apparatus of claim 16, wherein the logic circuitry is further configured and arranged to generate multiple speculative data units prior to receiving the grant data unit and to generate multiple non-speculative data units corresponding to each speculative data unit for which a non-acknowledgement data unit was received.

18. The apparatus of claim 16, wherein the logic circuitry is further configured and arranged to generate said at least one non-speculative data unit with or as part of a communication protocol which differentiates the at least one non-speculative data unit from a speculative type of data unit, and to cease generating speculative data units in response to receiving at least one of the grant data unit and a negative acknowledgement data unit, and to delay transmission of the at least one non-speculative data unit until after the time for transmission indicated in the grant data unit.

19. The apparatus of claim 16, wherein the logic circuitry is further configured and arranged to generate the reservation request data unit to prohibit the indication of a number of data units from falling outside of an acceptable range of data units per reservation request data unit.

20. The apparatus of claim 16, wherein the logic circuitry includes a sending device that is configured and arranged to send data over the routing network.

\* \* \* \* \*